US010282292B2

(12) United States Patent
Prodromou et al.

(10) Patent No.: US 10,282,292 B2
(45) Date of Patent: May 7, 2019

(54) CLUSTER-BASED MIGRATION IN A MULTI-LEVEL MEMORY HIERARCHY

(71) Applicant: Advanced Micro Devices, Inc., Sunnyvale, CA (US)

(72) Inventors: Andreas Prodromou, San Diego, CA (US); Mitesh R. Meswani, Austin, TX (US); Arkaprava Basu, Austin, TX (US); Nuwan S. Jayasena, Sunnyvale, CA (US); Gabriel H. Loh, Bellevue, WA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 57 days.

(21) Appl. No.: 15/295,025

(22) Filed: Oct. 17, 2016

(65) Prior Publication Data

US 2018/0107598 A1 Apr. 19, 2018

(51) Int. Cl.
*G06F 12/0811* (2016.01)
*G06F 9/50* (2006.01)

(52) U.S. Cl.
CPC ........ *G06F 12/0811* (2013.01); *G06F 9/5027* (2013.01)

(58) Field of Classification Search
CPC ........... G06F 12/0811; G06F 2212/283; G06F 3/0647; G06F 3/0646; G06F 3/0655
See application file for complete search history.

(56) References Cited

U.S. PATENT DOCUMENTS

| 2013/0024597 | A1* | 1/2013 | Loh | G06F 12/0897 |
| --- | --- | --- | --- | --- |
| | | | | 711/3 |
| 2014/0019677 | A1* | 1/2014 | Chang | G06F 12/0804 |
| | | | | 711/105 |
| 2014/0040698 | A1* | 2/2014 | Loh | G06F 13/1668 |
| | | | | 714/758 |
| 2015/0199126 | A1* | 7/2015 | Jayasena | G11C 11/005 |
| | | | | 711/103 |
| 2016/0335025 | A1* | 11/2016 | Vaknin | G06F 3/0647 |

OTHER PUBLICATIONS

Chou, C., Jaleel, A., and M.K. Qureshi, "CAMEO: A Two-Level Memory Organization with Capacity of Main Memory and Flexibility of Hardware-Manged Cache," 47th Annual IEEE/ACM International Symposium on Microarchitecture, 2014.*

* cited by examiner

*Primary Examiner* — Tracy A Warren

(74) *Attorney, Agent, or Firm* — Park, Vaughan, Fleming & Dowler LLP

(57) ABSTRACT

Cluster manager functional blocks perform operations for migrating pages in portions in corresponding migration clusters. During operation, each cluster manager keeps an access record that includes information indicating accesses of pages in the portions in the corresponding migration cluster. Based on the access record and one or more migration policies, each cluster manager migrates pages between the portions in the corresponding migration cluster.

20 Claims, 8 Drawing Sheets

KEY:

MIGRATION CLUSTER 700

MIGRATION CLUSTER 702

MAIN MEMORY 104

HIGH-BANDWIDTH MEMORY 106

| PAGE ID 502 | AC 504 |
|---|---|
| PAGE ID 502 | AC 504 |
| PAGE ID 502 | AC 504 |
| PAGE ID 502 | AC 504 |
| PAGE ID 502 | AC 504 |

ACCESS RECORD 500

| PAGE ID 602 | SOURCE 604 | DEST 606 |
|---|---|---|
| PAGE ID 602 | SOURCE 604 | DEST 606 |
| PAGE ID 602 | SOURCE 604 | DEST 606 |
| PAGE ID 602 | SOURCE 604 | DEST 606 |
| PAGE ID 602 | SOURCE 604 | DEST 606 |

REMAPPING RECORD 600

CLUSTER-BASED MIGRATION IN A MULTI-LEVEL MEMORY HIERARCHY

BACKGROUND

Some computing devices include two or more levels of memory organized in a multi-level memory hierarchy. In some of these computing devices, some or all of the levels of the multi-level memory hierarchy are implemented using different types of memory (i.e., memory circuits having different architectures, circuit structures, organization, etc.). For example, multi-level memory hierarchies may include some or all of dynamic random access memory (DRAM) or die-stacked DRAM, phase-change memory (PCM), non-volatile memory (NVRAM) such as flash, etc. Each type of memory has various characteristics, benefits, and limitations. For example, some types of memory, such as DRAM, enable faster memory accesses, but consume more electrical power, are more expensive, produce more heat, etc. As another example, some types of memory, such as flash memory, are cheaper and more scalable, but are slower to access.

In some cases, pages of memory (e.g., 2 KB blocks of data, instructions, etc.) may be stored in levels of multi-level memory hierarchies for which the corresponding type of memory is less than optimal for storing the page of memory. For example, a page of memory that is accessed often may be stored in a slower type of memory—thereby requiring more time for accesses than if the page of memory was stored in a faster type of memory. Because efficient operation of memory is an important aspect of the overall operation of computing devices, the storage of pages of memory in multi-level memory hierarchies is a concern.

BRIEF DESCRIPTION OF THE FIGURES

Throughout the figures and the description, like reference numerals refer to the same figure elements.

DETAILED DESCRIPTION

Figure 1:
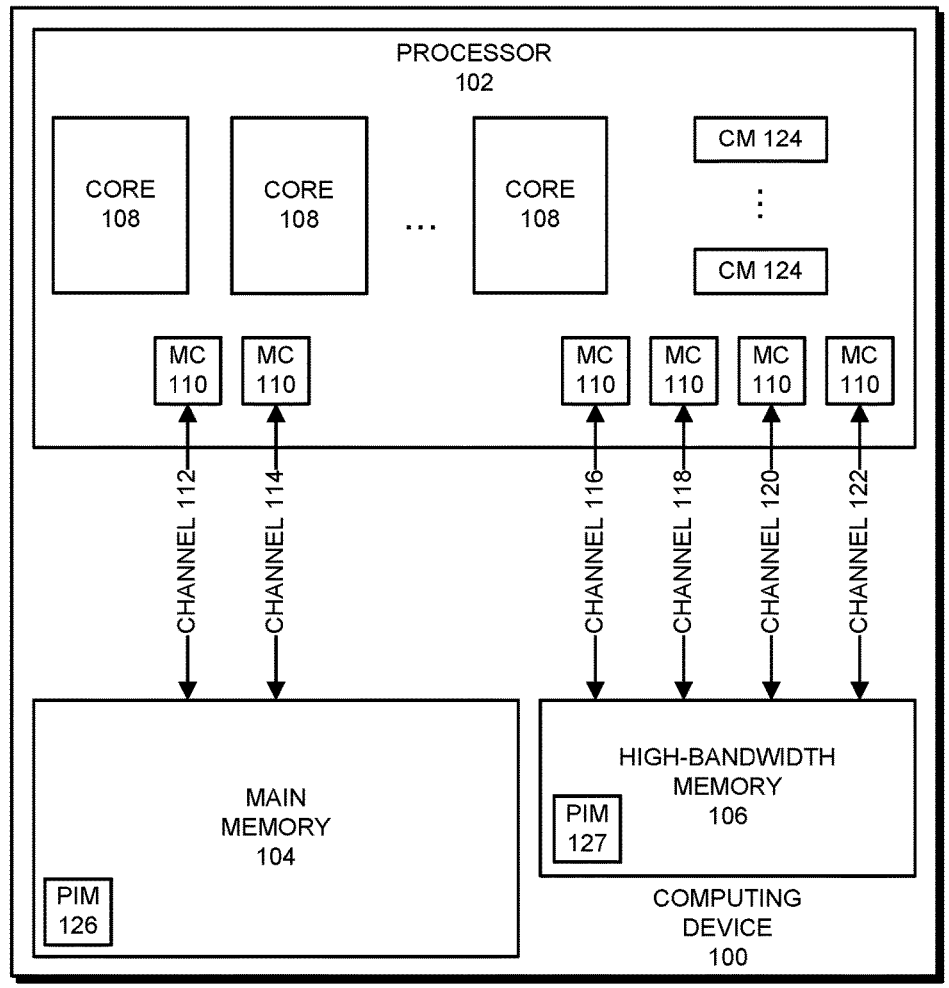
FIG. 1 presents a block diagram illustrating a computing device in accordance with some embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments. Thus, the described embodiments are not limited to the embodiments shown, but are to be accorded the widest scope consistent with the principles and features disclosed herein.

Terminology

In the following description, various terms may be used for describing embodiments. The following section provides a simplified and general description of some of these terms. Note that some or all of the terms may have significant additional aspects that are not recited herein for clarity and brevity and thus these descriptions are not intended to limit the terms.

Page/page of memory: a page is a block or portion of data in a memory in a computing device from which data (which may include actual data, instructions, etc.) can be acquired and used for performing computational operations. In some embodiments, pages are of a predefined size. For example, pages may be sized based on page sizes supported by an operating system in the computing device.

Multi-level memory hierarchy: a multi-level memory hierarchy is an arrangement of memory elements or devices that includes a number of "levels." Within a multi-level memory hierarchy, two or more of the levels include different types of memory with different operating characteristics, benefits, and/or limitations (e.g., access times, power usage, storage size, monetary cost, implementation complexity, etc.). For example, a multi-level memory hierarchy can include two or more of DRAM, stacked DRAM, phase-change memory (PCM), non-volatile random access memory (NVRAM), etc. arranged in two or more levels. For example, in some embodiments, the multi-level memory hierarchy includes a first memory level having lower access time and/or higher data rate, but a smaller capacity, and a second memory level having a higher access time and/or lower data rate, but a higher capacity. In some of these embodiments, the first memory level is a high-bandwidth memory that is implemented using two or more stacked DRAM integrated circuit chips in a processor package that are mounted directly atop the processor chip or side-by-side with the processor chip atop a silicon interposer, and the second memory level is a main memory that is implemented using DRAM integrated circuit chips external to the processor package.

Software entity: a software entity is an instance of software that is executed by the computing device such as an operating system, an application, firmware, a routine, etc., or some portion thereof. Software entities are capable of interacting with other software entities and/or hardware entities in order to perform corresponding operations.

Overview

The described embodiments manage the storage of pages of memory (or "pages") in a multi-level memory hierarchy in a computing device. In the described embodiments, the multi-level memory hierarchy is logically grouped into a number of migration clusters, each migration cluster including portions of memory in two or more levels of the multi-level memory hierarchy. For example, each migration cluster may include portions of memory accessible via one or more corresponding memory controllers and/or channels in two or more levels of the multi-level memory hierarchy. Each of the migration clusters is associated with a separate cluster manager functional block that monitors accesses of pages in the portions of memory in the migration cluster and, based on the accesses of pages and one or more migration policies, moves or "migrates" pages within the migration cluster. For example, the cluster manager may migrate pages so that pages that are being accessed more frequently are located in portions of the memory in the migration clusters for which access times are lower, or may migrate pages to avoid specified types of wear in portions of the memory in the migration cluster that are susceptible to wear-out (such as flash memory), etc. In some embodiments, each cluster manager performs the monitoring and migrating operations for pages only in the portions of memory in the corresponding migration cluster—and other cluster managers handle pages for other migration clusters.

In some embodiments, each cluster manager keeps records used for monitoring page accesses and handling the migration of pages. For example, the records can include an access record with information about page accesses for some or all of the pages in the portions of memory in the migration cluster. The access record can include information such as a count of accesses of each page, a count of accesses for a specified number (e.g., 10, 25, etc.) of the most-accessed pages, a summary of accesses per portion of the memory, etc. When corresponding pages are accesses (read, written, etc.), one or more records in the access record can be updated. The records can also include a remapping record with information about the locations of pages in the portions of memory in the migration cluster. The remapping record can include information such as source locations and post-migration destination locations for pages that have been migrated in the portions of memory in the migration cluster. Each time a page is migrated, the remapping record is updated to indicate the current location of the page. The remapping record can then be used to determine the portion of the multi-level memory hierarchy where the page is located when performing memory accesses.

The access record and the remapping record can be large, as each of the records can include information about each page of memory in possibly gigabyte or terabyte portions of the multi-level memory hierarchy. In some embodiments, therefore, the access record and/or the remapping record are divided into two or more subsections, with each subsection including a separate portion of the information in the corresponding record. In these embodiments, each cluster manager includes a cache memory that is used to store a number of the subsections of the access record and/or the remapping record, and the remaining subsections are stored in the high-bandwidth memory (or the main memory). The subsections of the access record and the remapping record are loaded to and unloaded from the cache in the cluster manager as necessary for determining page accesses and finding pages in the portions of memory in the migration cluster, respectively.

In some embodiments, the cluster manager or, more generally, the computing device, performs operations to increase the efficiency of updating and/or using the subsections of the access record and/or the remapping record. For example, in some embodiments, when performing an update of a subsection of the access record and/or the migration record that is not loaded into the cache in the cluster manager, the cluster manager sends a request to a processor in memory (PIM) in the high-bandwidth memory (or the main memory) to perform the update. The PIM, which is a functional block that can perform various operations on data in the high-bandwidth memory (or the main memory), then updates the subsection of the access record and/or the remapping record based on the request, avoiding the need to load the subsection to a cache in the cluster manager to be updated. As another example, in some embodiments, the cluster manager stalls memory access requests that rely on a given subsection of the remapping record until a "batch" of operations (e.g., a specified number, etc.) has been assembled. The cluster manager can then load the relevant subsection of the remapping record to the cache in the cluster manager, and release the stalled memory access requests so that the memory access requests are performed while the relevant subsection is stored in the cache.

In some embodiments, the migration operation is performed at a specified time interval (e.g., every N milliseconds, etc.). In these embodiments, the cluster managers monitor the accesses of pages regularly (e.g., continuously) and then perform the migration of pages (if pages are to be migrated) each time the interval expires. In some embodiments, the interval may be set and dynamically reset/updated to different values for one or more of the cluster managers. In these embodiments, some or all of the cluster managers can perform the migration operation asynchronously with respect to other cluster managers. In some embodiments, the cluster managers perform the migration operation based on factors in addition to or instead of the interval. For example, a cluster manager may perform a migration operation based on the access record, such as when a particular number of accesses have occurred in one or more subsections, when a particular ratio of accesses has occurred between two or more subsections (as in when a particular subsection is receiving more accesses than others, etc.), etc.

In some embodiments, the cluster managers perform the monitoring and migration operations without receiving control inputs from software entities executed by the computing device. For example, the cluster manager may perform the monitoring and migration operations without receiving commands, requests, etc. from an operating system, applications, etc. In these embodiments, the software entities may be unaware that cluster managers are handling the migration of pages in the corresponding migration clusters (i.e., may not include program code relating to the monitoring and/or migrating). This enables these embodiments to perform the monitoring and migration operations without also requiring that software entities be updated to include program code for interacting with cluster managers. In some embodiments, however, one or more software entities perform operations for influencing the migration of pages. For example, an operating system and/or an application can directly command cluster manager(s) to perform the migration operation, can provide migration "hints" on portions of the memory to which one or more specified pages should be migrated, etc.

As described above, cluster managers handle the monitoring and migrating operations only for the corresponding cluster and generally do not migrate pages between migration clusters and/or migrate pages in other migration clusters. In some embodiments, however, a software entity such as an operating system monitors page accesses in some or all of the migration clusters and, based on the monitored accesses, performs an inter-cluster migration operation during which pages are migrated between migration clusters. For example, an operating system, an application, etc. can perform the inter-cluster migration.

By using the cluster managers to migrate pages of memory in the migration clusters, the described embodiments enable the pages of memory to be stored in portions of memory that are better suited for the accesses that are occurring for the pages of memory (or for other pages of memory). This in turn can enable more efficient use of the memory, faster accesses of the pages, more balanced use of the underlying memory elements, etc. This can, in turn, improve the overall performance of computational operations by the computing device, leading to higher user satisfaction.

Computing Device

FIG. 1 presents a block diagram illustrating a computing device in accordance with some embodiments. As can be seen in FIG. 1, computing device 100 includes processor 102, main memory 104, and high-bandwidth memory 106. Processor 102 is a functional block that performs computational operations for computing device 100. Processor 102 includes a number of cores 108, each of which is a functional block that performs computational operations. For example, each core 108 may include one or more central processing units (CPU), graphics processing units (GPU), embedded processors, application-specific integrated circuits (ASIC), digital signal processors, etc. Processor 102 also includes a number of memory controllers ("MC") 110 and cluster managers ("CM") 124, which are described below.

Main memory 104 is a functional block that stores data and instructions for other functional blocks in computing device 100. Main memory 104 includes memory circuits such DRAM, double data rate (DDR) synchronous dynamic random access memory (SDRAM), non-volatile memory (flash, PCM, etc.), and/or other types of memory circuits, as well as control circuits for handling accesses of the instructions and data that are stored in the memory circuits.

Main memory 104 includes processor-in-memory ("PIM") 126. PIM 126 is a functional block that performs operations on data in memory 104 without first loading the data to another processor such as core 108. More specifically, PIM 126 acquires the data from memory (e.g., loads the data into a local buffer such as a row buffer in memory 104), performs the operations on the data, and writes the data directly back to memory from the buffer. In some embodiments, the computational operations include operations such as logical operations, mathematical operations, bitwise operations (inversions, shifts, etc.), etc. In some embodiments, the operations include updating the access record and/or the remapping record as described herein. Performing the operations in PIM 126 can avoid the need to communicate the data to and from another processor and perform the operation in the other processor, which can save significant amounts of time and avoid unnecessarily loading the other processor.

High-bandwidth memory 106 is a functional block that stores data and instructions for other functional blocks in computing device 100. High-bandwidth memory 106 includes memory circuits such DRAM, DDR SDRAM, and/or other types of memory circuits, as well as control circuits for handling accesses of the instructions and data that are stored in the memory circuits. In some embodiments, high-bandwidth memory 106 includes one or more stacks of DRAM chips (or "stacked DRAM") that are used for storing data and instructions. In some embodiments, high-bandwidth memory 106 is configured to provide higher bandwidth/data rate for data transfers to and from processor 102 than main memory. For example, high-bandwidth memory 106 may be located closer to processor 102, may be coupled to processor 102 via high-bandwidth channels, etc.

High-bandwidth memory 106 includes PIM 127. Similar to PIM 126 in main memory 104, PIM 127 is a functional block that performs operations on data in high-bandwidth memory 106 without first loading the data to another processor such as core 108.

Memory controllers 110 in processor 102 are functional blocks that perform operations for managing the exchange of data between processor 102 and main memory 104 and high-bandwidth memory 106. For example, memory controllers 110 may perform reads, writes, and/or other data accesses in main memory 104, may perform configuration and control operations for memory devices in main memory 104 (e.g., control data refreshes for dynamic memory devices, etc.), etc.

Channels 112-122 are coupled between corresponding memory controllers 110 and either main memory 104 (channels 112-114) or high-bandwidth memory 106 (channels 116-122). Each of the channels includes one or more communication paths (e.g., serial communication paths, a parallel communication path, etc.) that are used for communicating data, instructions, commands, and/or other information between the corresponding memory controller 110 and main memory 104 or high-bandwidth memory 106. For example, the communication paths may include one or more of wires, guides, communication regions, vias, and/or other signal routes, as well as corresponding circuit elements (e.g., repeaters, buffers, pads, etc.).

In some embodiments, each of channels 112-122 provides access to a corresponding portion of main memory 104 and high-bandwidth memory 106. For example, an address space of high-bandwidth memory 106 may be divided into four portions (e.g., 8 GB of address space may be divided into four 2 GB portions, etc.), with each of channels 116-122 providing access to a corresponding one of the portions. In these embodiments, each of the memory controllers 110 handles accesses to the portion of memory that is accessible via the corresponding channel. For example, the memory controller 110 coupled to channel 116 may, continuing the example above, control access to the portion of high-bandwidth memory 106 accessed via channel 116, the memory controller 110 coupled to channel 112 may control access to the portion of main memory 104 accessed via channel 112, etc.

Figure 2:
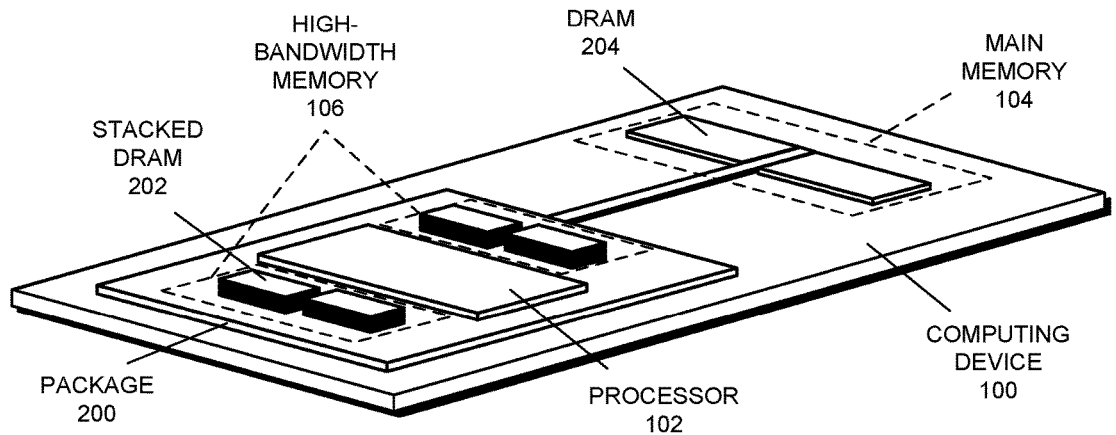
FIG. 2 presents a block diagram illustrating an isometric view of a computing device in accordance with some embodiments.

FIG. 2 presents a block diagram illustrating an isometric view of a computing device with a multi-level memory hierarchy in accordance with some embodiments. As can be seen in FIG. 2, computing device 100 includes a package 200 on which a processor 102 (e.g., a processor integrated circuit chip) and four stacked DRAM modules are mounted or otherwise coupled (one of which is labeled stacked DRAM 202). Package 200 includes a chip package, an interposer, and/or another mounting or holding mechanism that may have communication routes (wires, guides, etc.) and/or circuitry via which processor 102 and the stacked DRAM modules communicate with one another and external devices. Computing device 100 also includes, external to package 200, two DRAM modules (one of which is labeled DRAM 204). Each of the four stacked DRAM modules mounted on package 200 includes a number of DRAM integrated circuit chips (i.e., having DRAM memory circuits, etc. fabricated thereon) that are arranged in a stack and communicatively coupled to each other and/or processor 102 via through-silicon vias (TSVs), inductive and/or capacitive communication, etc. The DRAM modules external to package 200 each include one or more DRAM integrated circuit chips coupled via one or more signal routes (e.g., a bus, etc.) to processor 102.

In some embodiments, the stacked DRAM modules mounted on package 200 and the DRAM modules external to package 200 are included in two levels of a multi-level memory hierarchy. For example, the stacked DRAM modules may be included in a first level of the multi-level memory hierarchy, and the DRAM modules external to package 200 may be included in a second level of the multi-level memory hierarchy. The levels with which the stacked DRAM and DRAM modules are included may be designated in consideration of access time and size as, in some embodiments, the stacked DRAM modules may be smaller in capacity but significantly faster for processor 102 to access then the DRAM modules external to package 200.

Figure 3:
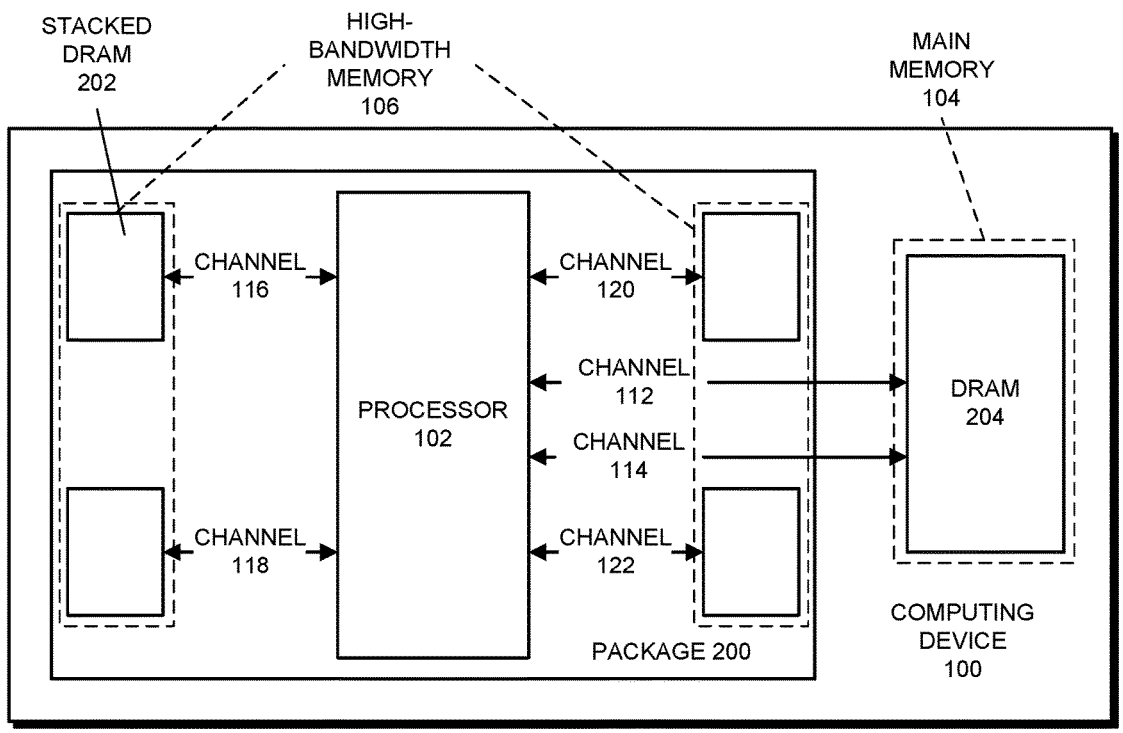
FIG. 3 presents a block diagram illustrating a top view of a computing device in accordance with some embodiments.

FIG. 3 presents a block diagram illustrating a top view of a computing device with a multi-level memory hierarchy in accordance with some embodiments. The block diagram shown in FIG. 3 is a top view of a similar embodiment to the isometric view shown in FIG. 2, but with channels 112-122 illustrated. As shown in FIG. 3, channels 112-114 are coupled between processor 102 and DRAM module 204 (i.e., main memory 104). Channels 112-114 may be implemented as a signal bus, wires, routes, etc. that are coupled to corresponding signal routes in processor 102 and the DRAM modules. Channels 116-122 are each coupled between processor 102 and a corresponding stacked DRAM module (i.e., high-bandwidth memory 106) (only one stacked DRAM module is labeled in FIG. 3 for clarity). Channels 116-122 may be implemented via signal routes in/on package 200 that are coupled to corresponding signal routes in processor 102 and the corresponding stacked DRAM module.

Although a particular arrangement of elements is illustrated in computing device 100 in FIGS. 2-3, in some embodiments, different elements may be present and/or the elements may be arranged differently. For example, in some embodiments, some or all of the processor and the stacked DRAM modules mounted on package 200 are enclosed in package 200. As another example, another number or arrangement of stacked DRAM modules or DRAM modules may be used. As yet another example, the DRAM modules may be stacked directly on processor 102 and may therefore directly interface with processor 102. Generally, the described embodiments can use any number or arrangement of elements that perform the operations herein described.

Figure 7:
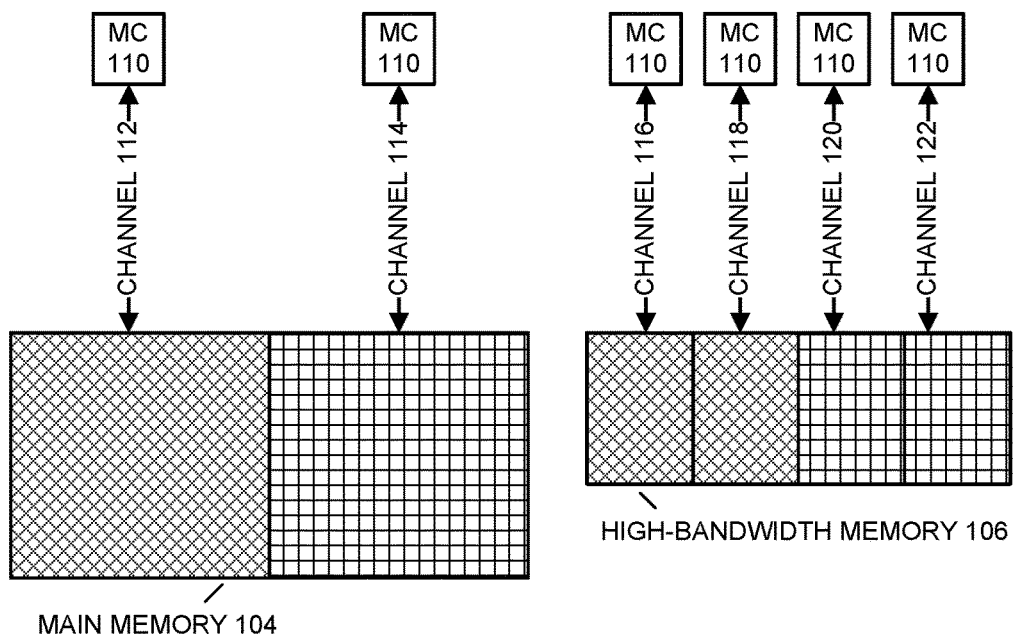
FIG. 7 presents a block diagram illustrating migration clusters in accordance with some embodiments.

In the described embodiments, the multi-level memory hierarchy is logically grouped into a number of migration clusters, each migration cluster including portions of memory in two or more levels of the multi-level memory hierarchy. Although various techniques for grouping may be used, in some embodiments, the grouping is based on memory controllers 110 and/or channels 112-122. FIG. 7 presents a block diagram illustrating migration clusters in accordance with some embodiments. As can be seen in FIG. 7, there are two migration clusters: migration cluster 700, which (as shown in the key) is marked with diagonal crosshatching, and migration cluster 702, which is marked with up and down crosshatching. Each of migration clusters 700 and 702 includes one of the memory controllers coupled to channels 112-114 (i.e., to main memory 104) and two of the memory controllers coupled to channels 116-122 (i.e., to high-bandwidth memory 106), so that there are three different memory controllers 110 in each migration cluster. In this way, the corresponding portions of main memory 104 and high-bandwidth memory 106 are included in one of migration clusters 700 and 702. In some embodiments, therefore, the migration clusters include portions of the memory in each level of the multi-level memory hierarchy. Including portions of each level of the multi-level memory hierarchy means that cluster managers are able to migrate pages of memory (or "pages") between the levels of the multi-level memory hierarchy while still only migrating pages within the portions of memory in the migration cluster.

Although an example of migration clusters is presented in FIG. 7, in some embodiments, a different arrangement of migration clusters is used. For example, in some embodiments, the migration clusters include different numbers and/or arrangements of portions of memory in the multi-level memory hierarchy.

Returning to FIG. 1, cluster managers 124 are functional blocks that perform operations for migrating pages in corresponding migration clusters. Generally, as used herein, "migrating" pages means moving pages of memory between portions of memory in migration clusters. For example, a page that is located in a portion of memory in main memory 104 in a migration cluster may be migrated, or moved, to a location in a portion of memory in high-bandwidth memory 106 within the same migration cluster—so that the page is no longer resident in main memory 104, but is instead resident in high-bandwidth memory 106. As described in detail herein, cluster manager 124 monitors accesses of pages in the corresponding migration cluster and, based on the monitored accesses and one or more migration policies, may migrate pages between the portions of memory in the corresponding migration cluster. Each cluster manager 124 is limited to intra-cluster migrations, i.e., does not migrate pages between migration clusters, but other entities (e.g., an operating system, a software application, etc.) may perform inter-cluster migrations.

Figures 4, 5, 6:
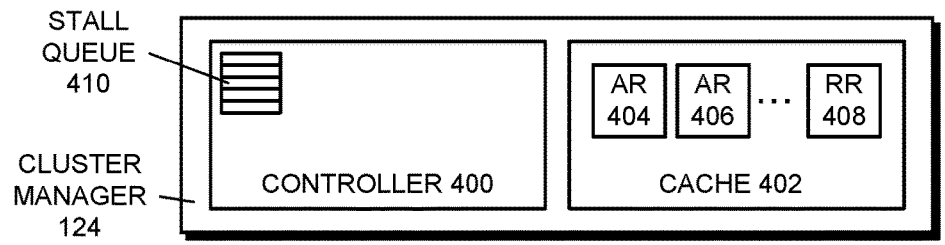
FIG. 4 presents a block diagram illustrating a cluster manager in accordance with some embodiments.
FIG. 5 presents a block diagram illustrating an access record in accordance with some embodiments.
FIG. 6 presents a block diagram illustrating a remapping record in accordance with some embodiments.

FIG. 4 presents a block diagram illustrating a cluster manager 124 in accordance with some embodiments. As can be seen in FIG. 4, cluster manager 124 includes controller 400 and cache 402. Controller 400 is a functional block that is configured to perform operations for migrating pages between portions of memory in a migration cluster and for generally controlling operation of cluster manager 124. For example, controller 400 can monitor accesses of pages in the portions of memory in the migration cluster, can determine pages to be migrated and the portions of memory to which the pages are to be migrated, can determine the locations of pages (including migrated pages) in the portions of memory when performing memory accesses, can forward memory accesses to appropriate portions of memory in the migration cluster, can perform control and communication operations for cluster manager 124, and/or can perform other operations described herein relating to migrating pages and/or operating cluster manager 124.

Cache 402 is a functional block that includes memory circuits for storing data to be used by controller 400 for performing operations relating to migrating pages in the portions of memory in the corresponding migration cluster. In some embodiments, some or all of a set of records relating to migrating pages are stored in cache 402 for use by controller 400. For example, in some embodiments, each of an access record and a remapping record are stored in cache 402. Generally, the access record and the remapping record are data structures (lists, tables, hashes, etc.) that include information about page accesses and page locations, respectively. FIGS. 5 and 6 present block diagrams illustrating an access record and a remapping record in accordance with some embodiments. As can be seen in FIG. 5, access record 500 includes a set of records (i.e., data pairs) in which a page ID 502 is associated with an access counter ("AC") 504. Page ID 502 includes an identifier for a corresponding page in a portion of memory in the migration cluster. Page ID 502 can include any value that identifies a page such as a page number, a string, etc. Access counter 504 is a counter in which a count of accesses to the page identified by the corresponding page ID 502 is kept. When a page is accessed, the corresponding access counter 504 is incremented or otherwise set to a corresponding value. At certain times, the access counter 504 for a page can be cleared (reduced to zero, etc.) or set to a specified value such as when a page is deallocated, initially allocated or accessed, migrated, etc.

Although embodiments are shown where access record 500 includes an individual access counter for each page in the migration cluster, in some embodiments, other forms of access record are kept. For example, some embodiments identify a set of most-accessed (or "hottest") pages and access record 500 includes a record of these pages (and perhaps only a record of these pages). In some of these embodiments, an algorithm such as a streaming majority element algorithm may be used to determine the hottest pages.

As can be seen in FIG. 6, remapping record 600 includes a set of data triples in which a page ID 602 is associated with a source 604 and a destination ("DEST") 606. Page ID 602 is an identifier for a corresponding page in a portion of memory in the migration cluster. Page ID 602 can include any value that identifies a page such as a page number, a string, etc. Source 604 includes an identification of a location in which the page was previously (e.g., originally, before the most recent migration, etc.) stored in the portions of memory in the migration cluster. For example, source 604 may include some or all of the bits for an address in memory where the page was previously stored and/or a value derived therefrom. Destination 606 includes an identification of a location in which the page is currently stored, such as after the page has been migrated. For example, destination 606 may include some or all of the bits for an address in memory where the page is currently stored and/or a value derived therefrom. In some embodiments, source 604 includes an identifier for a location known to other entities in computing device 100, such as to an operating system or an application program. In these embodiments, therefore, upon receiving a memory access request from an operating system or an application program directed to a location identified in a given source 604, cluster manager 124 can determine a location where the page is currently/actually stored based on the corresponding destination 606. By using the remapping record to translate locations as described, the described embodiments enable cluster manager 124 to perform migrations (i.e., move pages in the portions of memory in the migration cluster) without operating system involvement. In other words, cluster manager 124 may itself migrate pages and direct memory accesses so that other entities need not be informed of the migrations.

In some embodiments, remapping record 600 includes records for each page in the migration cluster. In these embodiments, records in remapping record 600 are initially set to a specified or default value and/or are marked as invalid, and are updated as a corresponding page is migrated and/or re-migrated within the migration cluster.

In some embodiments, remapping record 600 is initially empty, i.e., initially holds no records for migrated pages, and records are added to remapping record 600 as pages are migrated, so that remapping record 600 holds only records of pages that were migrated. In these embodiments, therefore, remapping record 600 grows in size to accommodate new records of migrated pages. In some of these embodiments, remapping record 600 is limited in size (i.e., is permitted to hold only a specified number of records for migrated pages). For example, remapping record 600 may be limited to being a size that will fit in a cache in cluster manager 124. Computing device 100 (e.g., an operating system executing on computing device 100) may therefore perform operations for managing remapping record 600, including preventing records from being lost or overwritten in the event that a new record is to be written to remapping record 600 when remapping record 600 is full. For example, at a specified time, such as periodically or when remapping record 600 is full, the operating system can read the records from remapping record 600 and use information from the records to update a page table (and possibly other records in computing device 100). In this way, the page table, and thus entities that read the page table for page location information, will have correct/updated page table entries for migrated pages. The operating system can then clear remapping record 600, i.e., remove all existing records from remapping record 600, which prepares remapping record 600 for adding new records, and perform other operations for resetting or otherwise updating the state of computing device 100 to reflect or account for the update of the page table (e.g., TLB shootdowns, etc.). In some of these embodiments, as pages are deallocated or otherwise removed from main memory 104 and high-bandwidth memory 106, corresponding records are deleted from remapping record 600.

Returning to cache 402 in FIG. 4, it can be seen that there are two access records 404-406 in cache 402. Cache 402 is shown in this way to illustrate that, in some embodiments, cache 402 may store one or more subsections of one or both of the access record and the remapping record (as shown in FIG. 4, there are two subsections of the access record stored in cache 402). In some embodiments, one or both of the access record and the remapping record are divided into two or more subsections. In these embodiments, some of the subsections for the access record and the remapping record are stored in cache 402 and the remaining subsections are stored in high-bandwidth memory 106 (or main memory 104). This can, for example, help to avoid the need to store the entire (possibly large) access record and/or remapping record in cache 402. In these embodiments, as with other types of caches, the cache may actually be insufficient in size to store the entire access record and/or remapping record. Cache memory control operations such as evictions, etc. may therefore be performed by cache 402 (or controller 400) to manage the subsections of the access record and/or the remapping record that are stored in cache 402 at a given time.

Stall queue 410 in controller 400 is a functional block that is configured to perform operations for buffering (i.e., storing temporarily) memory access requests received by cluster manager 124 (e.g., from a load/store unit in a core 108, etc.). In some embodiments, cluster manager 124 buffers received memory access requests in stall queue 410 (or "stalls" the memory requests) until a "batch," or a given number, of memory requests that depend on the same subsection of the remapping record have been received—or until a time-out value has passed since the first request was received. As used here, "depending" on the same subsection of the remapping record means that the cluster manager 124 will use the same subsection of the remapping record to determine a current location of a corresponding page in the portions of memory in the migration cluster. Cluster manager 124 can determine that the memory accesses are directed to the same subsection based, e.g., on addresses in the access requests, etc. When the batch of memory requests have been received, cluster manager 124 loads the corresponding subsection of the remapping record into cache 402 (it is assumed that the subsection was not already loaded into cache 402), acquires each memory access request from stall queue 410, and uses the subsection of the remapping record from cache 402 to perform the memory access requests (i.e., to look up a current location of the page in the subsection of the remapping record). In some cases, buffering the memory access requests as described can help to avoid repeated loading and unloading of subsections of the remapping record in cache 402 (i.e., thrashing in cache 402).

Although computing device 100 is described with a particular arrangement of functional blocks, some embodiments include a different number and/or arrangement of functional blocks. For example, some embodiments have multiple processors 102 and/or a different number of cores (as shown by the ellipsis in FIG. 1). Generally, in the described embodiments, computing device 100 can include any number or arrangement of functional blocks that perform the operations herein described.

Computing device 100 is simplified for illustrative purposes. In some embodiments, computing device 100 includes additional and/or different functional blocks or elements for performing the operations herein described and/or other operations. For example, computing device 100 may include mass storage devices (disks, large non-volatile semiconductor memories, etc.), power subsystems (AC power, batteries, etc.), media processing subsystems, networking subsystems, display subsystems, heating/cooling subsystems, communication subsystems (e.g., a northbridge, a southbridge, etc.), peripheral devices, I/O devices, etc.

Although embodiments are described using a high-bandwidth memory 106 implemented using DRAM modules and main memory 104, in other embodiments, different arrangements of memory are used. For example, in some embodiments, off-package DRAM (which may be located similarly to main memory 104 in FIG. 2) serves as the first memory and slower non-volatile memory (e.g., flash memory, etc., which is not shown) serves as the second memory. Generally, in the described embodiments, the levels in the memory hierarchy include one or more levels that include memory elements that have one or more operating characteristics (e.g., speed, access timing, physical location, monetary cost, implementation complexity, layout size, power consumption, etc.) that are different than the other levels, and thus migrating pages between the levels can be beneficial.

Although main memory 104 and high-bandwidth memory 106 are shown with PIMs 126 and 127, respectively, in some embodiments, one or both of main memory 104 and high-bandwidth memory 106 does not have a PIM. In these embodiments, the subsections of the remapping record and the access record are not operated on in main memory 104 and/or high-bandwidth memory 106, but instead are loaded to cache 402 in cluster manager 124 to be operated on by cluster manager 124.

Computing device 100 can be, or can be included in, any type of electronic device. For example, computing device 100 can be, or can be included in, electronic devices such as desktop computers, laptop computers, wearable computing devices, tablet computers, smart phones, servers, network appliances, toys, audio-visual equipment (stereo receivers, televisions, projectors, set top boxes, etc.), home appliances, vehicles (autos, trucks, airplanes, etc.), industrial controllers, and/or other electronic devices.

Migrating Pages

Figure 8:
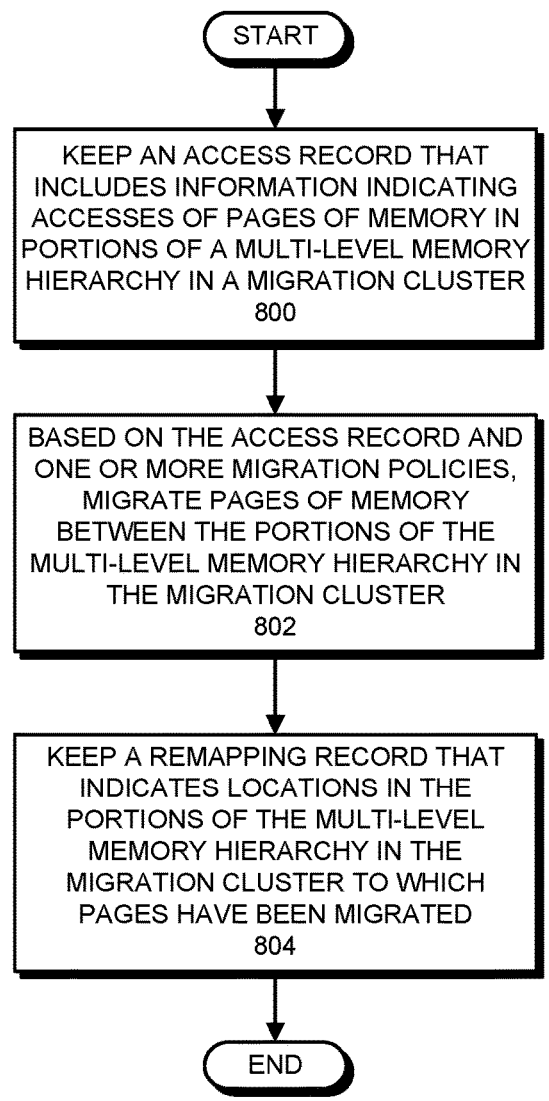
FIG. 8 presents a flowchart illustrating a process for migrating pages in accordance with some embodiments.

As described above, a cluster manager performs operations for migrating pages in portions of memory in a migration cluster. FIG. 8 presents a flowchart illustrating a process for migrating pages in accordance with some embodiments. The operations shown in FIG. 8 are presented as a general example of operations performed by some embodiments. The operations performed by other embodiments include different operations and/or operations that are performed in a different order. Additionally, although certain mechanisms/elements are used in describing the operations (e.g., a cluster manager, etc.), in some embodiments, other mechanisms perform the operations and/or the operations are performed on other mechanisms/elements.

The process shown in FIG. 8 starts when a cluster manager keeps an access record that includes information indicating accesses of pages of memory in portions of a multi-level memory hierarchy in a migration cluster (step 800). For example, the cluster manager can keep an access record that includes a count of the accesses (e.g., reads, writes, modifications, permission or metadata changes, etc.) for each page of memory in the portions of memory in the multi-level memory hierarchy. In this case, each time a page is accessed, the cluster manager determines that the page has been accessed, e.g., by monitoring access requests, row buffer hits, monitoring locations in memory that are accessed, etc. The cluster manager then updates a corresponding count of accesses to the page such as by incrementing the count by a specified amount, setting the count to a specified value, etc.

In addition to, or as an alternative to, keeping a count of the accesses of each page, the cluster manager can keep an access record that includes summary information and/or information about a limited number of pages (i.e., not all of the pages), such as keeping a record of a number of the most recently accessed pages, most accessed pages, accessed pages in particular physical locations of the portions of memory in the migration cluster, pages experiencing accesses of particular types, etc. For example, information about page accesses may not be kept until a page has been accessed at least one time, after which a record is kept for the page for a specified amount of time and/or as long as accesses continue to be made to the page. In some embodiments, an algorithm such as a streaming majority element algorithm can be used to determine the pages for which information is to be kept in the access record.

In some embodiments, keeping the access record includes storing subsections of the access record in a cache in the cluster manager and then updating corresponding information in the access record. In these embodiments, because the access record may be large (in terms of bytes required to store the access record), it may be impractical to store all of the of the access record locally in the cluster manager at the same time. Instead, the cluster manager has a cache with sufficient capacity to hold one or more subsections of the access record (possibly along with subsections of the remapping record, as described below) and the remaining subsections are stored in the high-bandwidth memory (or in main memory). For example, the cluster manager and/or another entity may divide the access record into a number of same-sized subsections according to the capacity of the cache, the size of the access record, and/or other factor(s) and designate the cache or high-bandwidth memory (or main memory) location where each subsection is to be stored. In these embodiments, the subsections of the access record may be loaded into the cache for use by the cluster manager and then evicted based on one or more cache management policies. For example, a least recently used subsection may be evicted to make room for a subsection that is being loaded to the cache. Generally, when managing the cache, the cluster manager can use any of the various well-known cache management policies. In these embodiments, when keeping the access record, the cluster manager may load/evict subsections of the access record to/from the cache as necessary.

Next, based on the access record and one or more migration policies, the cluster manager migrates pages of memory between the portions of the multi-level memory hierarchy in the migration cluster (step 802). As described above, when "migrating" pages, the cluster manager moves the page from a first portion of the memory in the migration cluster to a second portion of the memory. Using FIG. 7 as an example, the cluster manager may migrate/move a page from the portion of main memory 104 in migration cluster 700 to one of the two portions of high-bandwidth memory 106 in migration cluster 700. In this way, the page is removed from the main memory and relocated to the high-bandwidth memory. In some embodiments, migrating pages includes stalling, rejecting, or otherwise handling memory access requests received during the migration (i.e., until the migration is completed) to avoid performing the memory access requests improperly.

For migrating pages based on the access record and one or more migration policies, the cluster manager uses the information in the access record and the one or more migration policies to determine pages that are to be migrated and where the pages are to be migrated, if any pages are to be migrated. For example, the cluster manager may check the information indicating accesses of pages in the access record to determine pages that were accessed in particular ways (e.g., the most accessed, least accessed, accessed more than a threshold number of times, accessed for write/read, etc.) over a given timeframe (e.g., X milliseconds, etc.) and then check an available migration policy to determine pages that are to be migrated and the portions of memory in the migration cluster to which the pages are to be migrated. One example of a migration policy is to always have a number (e.g., 36, 100, etc.) of the most-accessed pages in the high-bandwidth memory. In this case, when some or all of the number of the most-accessed pages are not already in the high-bandwidth memory (but instead are in the main memory), the pages are migrated from the main memory to the high-bandwidth memory. If necessary, pages other than the number of the most-accessed pages can be migrated from the high-bandwidth memory to the main memory to make space for the most-accessed pages. Another example of a migration policy is to swap hotter pages (pages that are being accessed relatively frequently) from a main memory into a high-bandwidth memory in place of colder pages (pages that are being accessed less frequently). Another example of a migration policy is to have pages that are being accessed in a particular area, manner (e.g., read, write, etc.), type of memory, etc. migrated into another area or type of memory. For example, if a particular region of memory in the high-bandwidth memory is being heavily accessed, even pages that are not being accessed that often may be migrated to the main memory. This can help to avoid wear on the region of memory, remove load on particular memory controllers, etc. Generally, any migration policy that provides a reason for migrating pages based at least in part on the amount, character, nature, type, etc. of page accesses and/or one or more runtime conditions (e.g., workload profile, type of computational operations being performed, applications being executed, etc.) can be used. In some embodiments, migration policies may be expressed using configuration files, firmware, etc. that are readable and/or interpretable by the cluster managers.

In some embodiments, migration includes migration within a same portion of memory, such as migrating pages from location to location within the high-bandwidth memory. For example, pages may be migrated from a first area of a particular portion of the memory in the migration cluster to a second area to avoid wear on the first area.

In some embodiments, the migration is performed using one or more other entities in computing device 100. For example, the cluster manager may send corresponding requests to a direct memory access (DMA) functional block to cause the DMA functional block to perform the actual moving of the page from one location to another. In these embodiments, the cluster manager is configured with one or more mechanisms for communicating with the other entities in the computing device.

In some embodiments, the migration is performed periodically. For example, the cluster managers may, perform the migration operation at a specified migration interval (e.g., after a given number of milliseconds, each time a particular event occurs, etc.). In some embodiments, the migration interval is the same for each cluster manager, so that cluster managers are substantially synchronized in the migration of pages within the corresponding migration clusters. In some embodiments, however, the migration interval can be different for each cluster manager and cluster managers may perform migrations asynchronously with respect to one another. For example, one or more of the cluster managers and/or other entities (e.g., a core, a software application, an operating system, etc.) may set and/or update a migration interval for one or more of the cluster managers based on one or more factors or runtime conditions such as memory access load per portion of memory in a migration cluster, memory access types, workload type, priority of workload, etc. In this case, a migration interval may be initially set to a given value for a cluster manager, but be updated one or more times dynamically (i.e., as computing device 100 operates).

In some embodiments, the migration of pages is performed without receiving corresponding commands from software entities. In other words, the migration of pages is performed by the cluster manager (a hardware entity) without receiving an input from a software entity (an operating system, an application, etc.) that causes the migration. In this way, software entities that were programmed for systems without the migration of pages need not be changed/reprogrammed to execute on computing device 100. In some embodiments, however, while not directly causing the migration of pages, software and/or other entities provide inputs to cluster managers such as migration policies, interval updates, suggestions of particular pages to be migrated or not migrated, etc.

In some embodiments, software and/or other entities may command or otherwise cause the migration of pages, such as an operating system or application sending a command to a cluster manager to cause the cluster manager to perform a particular migration. For example, a command from a software entity may indicate one or more pages to be migrated, an area of memory from which or to which pages are to be migrated, etc. In some of these embodiments, cluster managers only perform migrations on command.

Returning to FIG. 8, the cluster manager next keeps a remapping record that indicates locations in the portions of the multi-level memory hierarchy in the migration cluster to which pages have been migrated (step 804). As described above, the remapping record includes a set of records for migrated pages, with each record including an indication of an original location for a page, e.g., a location in memory at which the page is to be accessed by an operating system executing on the computing device and/or a load-store unit on a core, and an indication of a current location for the page (which may be one or more migrations away from the original location). When keeping the remapping record, therefore, upon migrating (i.e., moving) a page from a location in a portion of the memory in the migration cluster to a location in another portion of the memory in the migration cluster, the cluster manager updates the remapping record by adding, to a record for the page, an indication of the current location for the page, i.e., an indication of the location in the other portion of the memory in the migration cluster.

In some embodiments, the remapping record includes a record for each page, or at least each page that can be migrated, within the migration cluster. In these embodiments, keeping the remapping record means updating a corresponding record in the remapping record when a page is migrated in the migration cluster. In some embodiments, however, the remapping record includes only information about pages that have been migrated and that are still held in the memory. In these embodiments, keeping the remapping record includes some or all of adding a record about a page when the page is first migrated, updating the record about the page if and when the page is again migrated, and deleting the record from the remapping record when the page is deallocated or otherwise removed from memory. As described above, in some embodiments, remapping record is bounded in size (i.e., is limited to holding a specified number of records of pages) and computing device 100 performs one or more operations for managing the remapping record, such as occasionally flushing information from the remapping record to the page table, etc.

In some embodiments, keeping the remapping record includes storing subsections of the remapping record in a cache in the cluster manager and then updating corresponding information in the remapping record. In these embodiments, because the remapping record may be large (in terms of bytes required to store the remapping record), it may be impractical to store all of the remapping record locally in the cluster manager at the same time. Instead, the cluster manager has a cache with sufficient capacity to hold one or more subsections of the remapping record (possibly along with subsections of the access record, as described above) and the remaining subsections are stored in the high-bandwidth memory (or in main memory). For example, the cluster manager and/or another entity may divide the remapping record into a number of same-sized subsections according to the capacity of the cache, the size of the remapping record, and/or other factor(s) and designate the cache or main memory location where each subsection is to be stored. In these embodiments, when managing the storage of the subsections of the remapping record in the cache, the cluster manager can use any of various well-known cache management policies, as described above.

In some embodiments, when keeping one or both of the access record and the remapping record, the cluster manager interacts with a PIM to cause updates to be made to the access record and/or the remapping record. As described above, in some embodiments, subsections of the access record and/or the remapping record may be stored in the high-bandwidth memory (or the main memory). In these embodiments, using one or more purpose-specific and/or general commands supported by the PIM, the cluster manager causes the PIM to perform corresponding updates to the access record and/or the remapping record. For example, assuming that a record for a page in the remapping record is to be updated after the page is migrated, the cluster manager may send, to the PIM, a request to write corresponding information (e.g., an updated indication of the current location of the page) to the record for the page. As another example, assuming that a record for a page in the access record is to be updated upon determining that the page has been accessed, the cluster manager may send a request to increment a corresponding access counter and/or update summary information for the migration cluster. In these embodiments, the subsections of the access record and/or the remapping record may be operated on entirely in the high-bandwidth memory (or in the main memory) by the PIM and may not, for example, be loaded to the cache as described above. The cluster manager, therefore, aside from sending the requests to the PIM, may not perform further operations relating to the updating of the access record and/or the remapping record.

As described above, in some embodiments, the cluster managers only perform intra-cluster migrations of pages. In other words, the cluster managers only migrate/move pages within the portions of memory in the corresponding migration cluster, and do not migrate/move pages into portions of memory in other migration clusters. In these embodiments, avoiding inter-cluster migration by cluster managers can simplify the amount of information that is to be stored by the cluster managers because cluster managers are not responsible for keeping records of locations of pages in other clusters. In addition by avoiding inter-cluster migration by the cluster managers, the cluster managers can steer requests to migrated pages within the corresponding migration cluster, but need not re-direct memory access requests to other cluster managers (as might be required if cluster managers were allowed to perform inter-cluster migration).

Handling Memory Accesses of Pages in Migration Clusters

Figure 9:
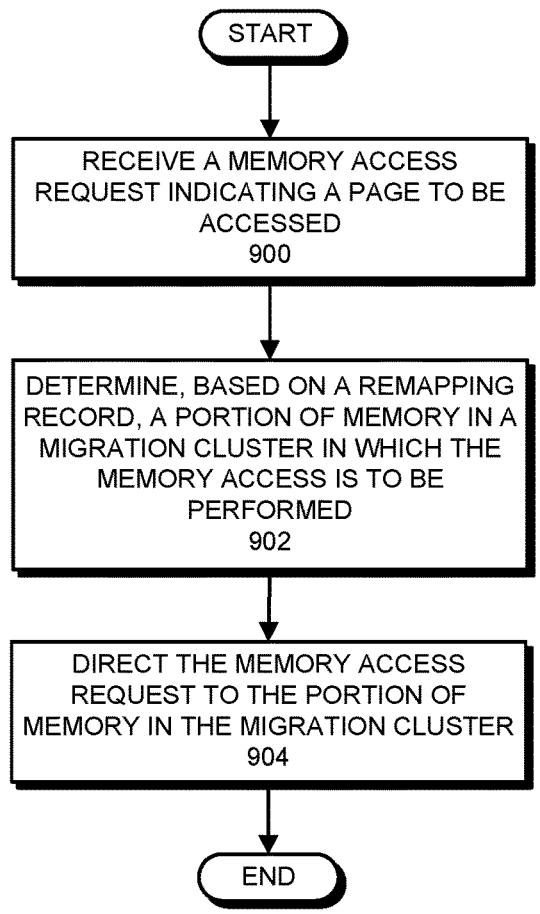
FIG. 9 presents a flowchart illustrating a process for handling memory access requests in accordance with some embodiments.

In the described embodiments, a cluster manager performs operations for handling memory accesses of pages in a migration cluster. For example, the cluster manager may determine locations for pages, including migrated pages, in portions of memory in the migration cluster in order to direct received memory access requests to the proper portion for performing the corresponding memory access. FIG. 9 presents a flowchart illustrating a process for handling memory access requests in accordance with some embodiments. The operations shown in FIG. 9 are presented as a general example of operations performed by some embodiments. The operations performed by other embodiments include different operations and/or operations that are performed in a different order. Additionally, although certain mechanisms/elements are used in describing the operations (e.g., a cluster manager, etc.), in some embodiments, other mechanisms perform the operations and/or the operations are performed on other mechanisms/elements.

The process shown in FIG. 9 starts when a cluster manager receives a memory access request indicating a page to be accessed (step 900). For example, the cluster manager may receive, from a load/store unit on a processor, a peripheral, etc., a request to perform a read, a write, a modification of metadata, etc. for the indicated page. In some embodiments, the memory access request includes some or all of an address for a location in memory to be accessed (e.g., some or all of a set of bits of the address) that serves as the indicator of the page and/or another identifier for the page, such as a page ID, etc. Because the cluster manager may have migrated the page, the address that is known to the load/store unit (or the operating system, application program, etc. that initiated the request) or the peripheral may not be the address where the corresponding data is located. As described below, the remapping record is used to ensure that the request is directed to the appropriate portion of memory in the migration cluster.

In some embodiments, the cluster manager is coupled between source(s) of memory access requests, e.g., load/store units, peripherals, etc., and the memory controllers that perform the memory accesses. In these embodiments, the cluster manager intercepts or otherwise receives memory access requests from the sources and then directs memory access requests to portions of memory as described in FIG. 9.

The cluster manager then determines, based on a remapping record, a portion of memory in a migration cluster in which the memory access is to be performed (step 902). For the determining, the cluster manager may use some or all of the indicator of the page to find a record for the page in the remapping record, and may acquire a current location of the page from the record of the page. For example, in some embodiments, the remapping record includes a record for each available page in the migration cluster and finding the record includes performing a search or lookup in the remapping record based on the indicator of the page. In some embodiments, the current location of the page in the remapping record is an indicator of a corresponding portion of memory in the migration cluster, such as a string or number associated with the corresponding portion of memory. For example, each portion of memory in the migration cluster may be associated with a different identifier.

As described above, in some embodiments, one or more subsections of the remapping record may be stored in a cache in the cluster manager, with remaining subsections stored in the high-bandwidth memory (or the main memory). In these embodiments, the above-described determining operation may include loading, to the cache, the corresponding subsection of the remapping record. In some embodiments, the cluster manager determines the subsection of the remapping record in which a corresponding record is located based at least in part on the above-described indicator of the page in the memory access request.

The cluster manager then directs the memory access request to the portion of memory in the migration cluster (step 904). When directing the memory access request, the cluster manager can communicate the memory access request to a corresponding memory controller and the memory controller can handle the memory access request using techniques known in the art.

Stalling Memory Access Requests

Figure 10:
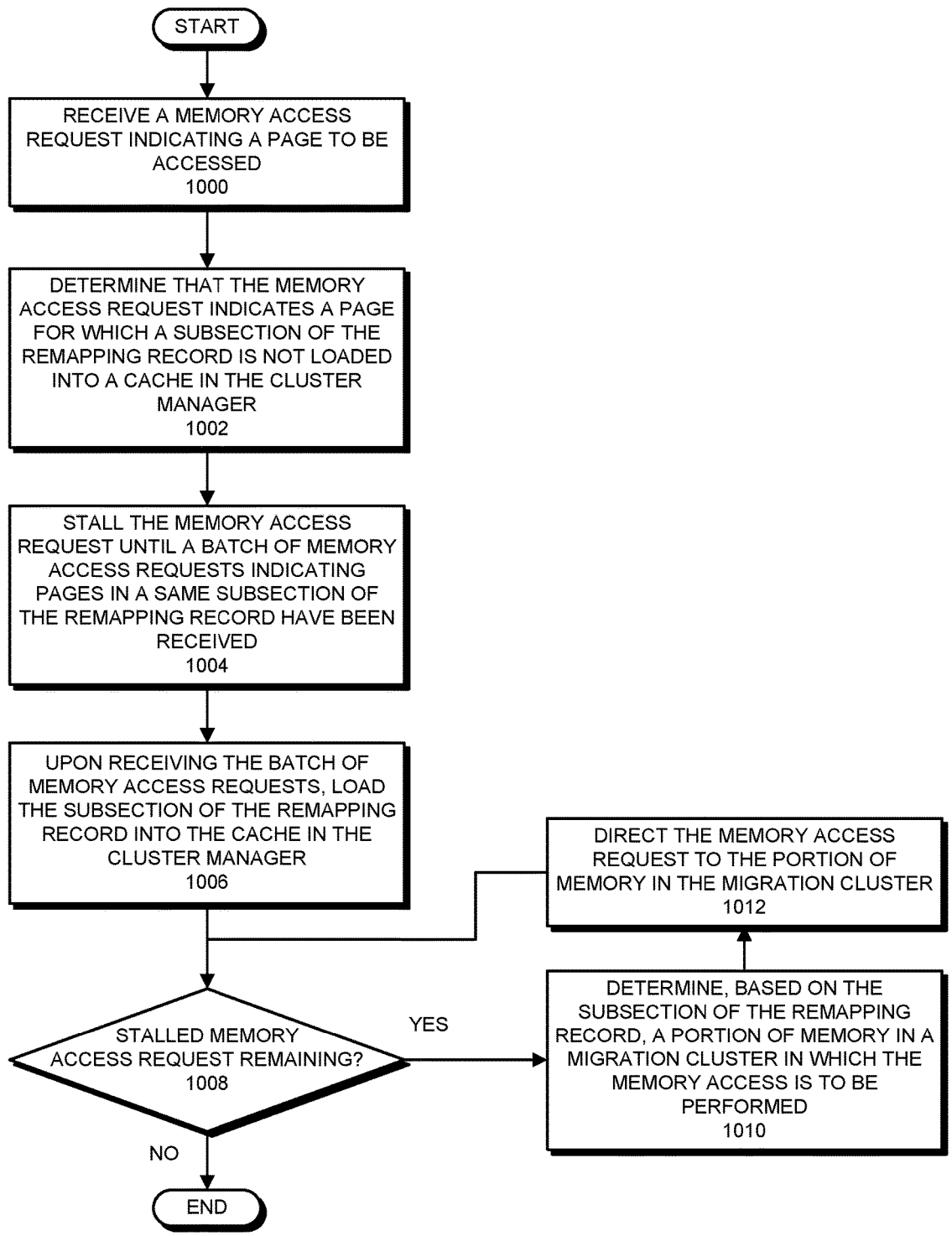
FIG. 10 presents a flowchart illustrating a process for stalling memory access requests in accordance with some embodiments.

In the described embodiments, when performing operations for handling memory accesses for pages in a migration cluster, a cluster manager may stall certain memory access requests to enable more efficient processing of the memory access requests. FIG. 10 presents a flowchart illustrating a process for stalling memory access requests in accordance with some embodiments. The operations shown in FIG. 10 are presented as a general example of operations performed by some embodiments. The operations performed by other embodiments include different operations and/or operations that are performed in a different order. Additionally, although certain mechanisms/elements are used in describing the operations (e.g., a cluster manager, etc.), in some embodiments, other mechanisms perform the operations and/or the operations are performed on other mechanisms/elements.

The process shown in FIG. 10 starts when a cluster manager receives a memory access request indicating a page to be accessed (step 1000). For example, the cluster manager may receive, from a load/store unit on a processor, a peripheral, etc., a request to perform a read, a write, a modification of metadata, etc. for the indicated page. In some embodiments, the memory access request includes some or all of an address for a location in memory to be accessed (e.g., some or all of a set of bits of the address) that serves as the indicator of the page and/or another identifier, such as a page ID.

The cluster manager then determines that the memory access request indicates a page for which a subsection of the remapping record is not loaded into a cache in the cluster manager (step 1002). For example, the cluster manager may keep a subsection record that identifies the various subsections, if any, that are currently loaded into the cache in the cluster manager. When performing the determining, the cluster manager may, based at least in part on the identifier for the page, perform a lookup in the subsection record to check if the subsection is loaded (i.e., stored, present, etc.) in the cache. Based on the lookup, the cluster manager determines that the subsection is not loaded into the cache. Recall that, as described above, this occurs when the subsection is instead stored in the high-bandwidth memory (or the main memory).

The cluster manager then stalls the memory access request until a batch of memory access requests indicating pages in a same subsection of the remapping record (or "similar memory access requests") have been received (step 1004). For this operation, the cluster manager may store received similar memory access requests in a stall queue and hold (or "stall") the memory access requests in the stall queue until a batch of similar memory access requests having a specified number, type, access pattern, etc., have been received. The cluster manager then, upon receiving the batch of memory access requests, loads the subsection of the remapping record into the cache in the cluster manager (step 1006). Loading the subsection of the remapping record involves acquiring the subsection of the remapping record from the high-bandwidth memory (or the main memory) and storing the subsection of the remapping record into an available location in the cache in the cluster manager. If there are no available locations, the cluster manager evicts another subsection of the remapping record and/or a subsection of the access record from the cache in the cluster manager to free up space for the subsection of the remapping record.

Although embodiments are described that wait for a batch of memory access requests to be received before loading the subsection of the remapping record to the cache in the cluster manager, in some embodiments, one or more other conditions can cause the subsection of the remapping record to be loaded. For example, the cluster manager may monitor a time since a first stalled memory access associated with a particular subsection of the remapping record was received and, when an expiration time has passed without receiving sufficient memory access requests to form a batch, may load the subsection of the remapping record and continue with subsequent operations in FIG. 10 without further stalling the stalled memory access requests.

The cluster manager then processes each of the previously stalled memory access requests (step 1008). More specifically, for each memory access requests, the cluster manager determines, based on the subsection of the remapping record that was loaded to the cache in the cluster manager, a portion of memory in a migration cluster in which the memory access is to be performed (step 1010). For the determining, the cluster manager may use some or all of the indicator of the page to find a record for the page in the subsection of the remapping record, and may acquire a current location of the page from the record of the page. For example, in some embodiments, the subsection of the remapping record includes a record for each available page in the migration cluster and finding the record includes performing a search or lookup in the subsection of the remapping record based on the indicator of the page. In some embodiments, the current location of the page in the subsection of the remapping record is an indicator of a corresponding portion of memory in the migration cluster, such as a string or number associated with the corresponding portion of memory. The cluster manager then directs the memory access request to the portion of memory in the migration cluster (step 1012). When directing the memory access request, the cluster manager can communicate the memory access request to a corresponding memory controller and the memory controller can handle the memory access request using techniques known in the art.

By stalling memory access requests as described, these embodiments can avoid repeatedly loading subsections of the remapping record in the cache in the cluster manager and possibly needing to evict other, useful subsections of the remapping record from the cache in the cluster manager to make space. In other words, these embodiments avoid thrashing in the cache in the cluster manager, as well as avoiding memory system operations, etc.

Inter-Cluster Migration

Figure 11:
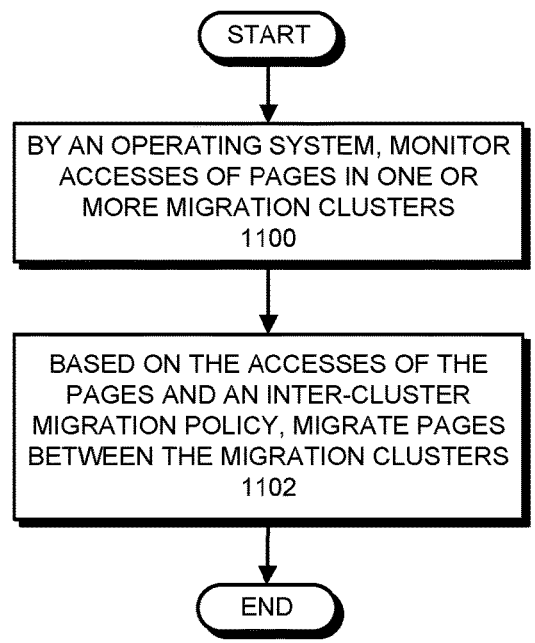
FIG. 11 presents a flowchart illustrating a process for inter-cluster migration in accordance with some embodiments.

In the described embodiments, the computing device may perform inter-cluster migration. FIG. 11 presents a flowchart illustrating a process for inter-cluster migration in accordance with some embodiments. The operations shown in FIG. 11 are presented as a general example of operations performed by some embodiments. The operations performed by other embodiments include different operations and/or operations that are performed in a different order. Additionally, although certain entities are used in describing the operations (e.g., an operating system, etc.), in some embodiments, other entities perform the operations and/or the operations are performed on other entities.

In some embodiments, inter-cluster migration is not performed by cluster managers. This avoids cluster managers being obligated to keep records of pages that might be migrated to other clusters, such as remapping records, access records, etc. In this way, the records relating to migration can be limited in scope to the particular migration cluster to which they apply. There may be a use, however, for rebalancing pages between migration clusters. For example, when pages in a particular migration cluster are being accessed at a higher rate than pages in one or more other migration clusters, which can lead to bottlenecks, uneven power use/temperature distributions, uneven wear on memory circuits, etc. Because the cluster managers only maintain records for the corresponding clusters, however, it falls on another entity, such as an operating system and/or hardware controller, to perform the inter-cluster migration.

The process shown in FIG. 11 starts when an operating system executed by computing device 100 monitors accesses of pages in one or more of the migration clusters (step 1100). For example, the operating system may acquire the access records and/or other information (e.g., periodic reports, etc.) from the corresponding cluster managers to monitor the accesses of pages. As another example, the operating system can monitor memory access requests and/or memory accesses of pages directly or indirectly.

Based on the accesses of pages and one or more inter-cluster migration policies, the operating system then migrates pages between the migration clusters (step 1102). As one example of an inter-cluster migration policy, the operating system may migrate pages between migration clusters so that pages that are being accessed more frequently are spread more evenly between the migration clusters. As another example of an inter-cluster migration policy, the operating system may migrate pages between migration clusters so that pages are located in particular types of memory, physical areas of memory, etc. Generally, any inter-cluster migration policy that provides a reason for migrating pages between migration clusters based at least in part on the amount, character, nature, type, etc. of page accesses can be used. When migrating pages, the operating system performs corresponding recordkeeping operations such as updating page tables, updating computing device structures such as translation lookaside buffers, etc. In some embodiments, cluster managers may detect or otherwise be informed of inter-cluster migrations and make corresponding adjustments to access records, remapping records, etc. In other words, as pages are added to and removed from migration clusters, the corresponding cluster managers may add or remove corresponding records of the pages.

In some embodiments, along with monitoring page accesses, the operating system monitors one or more runtime conditions in the computing device, such as by profiling the workload in the computing device, monitoring applications that are executed by the computing device, etc. In these embodiments, the one or more runtime conditions can be used as part of the determination of whether inter-cluster migration is to occur. For example, when a workload profile of the computing device is known or predicted to change from one phase (e.g., a compute phase) to another (e.g., a memory write back phase), the operating system can take the workload profile into account when determining whether and how to migrate pages between clusters.

In some embodiments, the inter-cluster migration policy is configured so that inter-cluster migrations happen relatively rarely, such as under circumstances of significantly unbalanced page accesses in migration clusters, heavy use of particular types of memory, etc. For example, a migration may only happen when almost all page accesses are happening within one migration cluster in a computing device that has multiple migration clusters, etc. Avoiding migrating pages between clusters can avoid the need for the operating system to perform the corresponding recordkeeping operations, which are typically high-latency.

In some embodiments, the migration policy is handled at least in part by an application executed by the computing device. For example, an application may indirectly or directly request inter-cluster migration from the operating system, may inform the operating system of upcoming page access patterns or candidates, may set and update an expression of migration policy (e.g., in one or more configuration files), etc. In these embodiments, the application may itself monitor accesses of pages and/or otherwise determine pages to be accessed, may monitor operating conditions, etc.

In some embodiments, a computing device (e.g., computing device 100 in FIG. 1 and/or some portion thereof) uses code and/or data stored on a non-transitory computer-readable storage medium to perform some or all of the operations herein described. More specifically, the computing device reads the code and/or data from the computer-readable storage medium and executes the code and/or uses the data when performing the described operations.

A computer-readable storage medium can be any device or medium or combination thereof that stores code and/or data for use by a computing device. For example, the computer-readable storage medium can include, but is not limited to, volatile memory or non-volatile memory, including flash memory, random access memory (SRAM, DRAM, DDR, DDR2/DDR3/DDR4 SDRAM, etc.), read-only memory (ROM), and/or magnetic or optical storage mediums (e.g., disk drives, magnetic tape, CDs, DVDs).

In some embodiments, one or more hardware modules are configured to perform the operations herein described. For example, the hardware modules can include, but are not limited to, one or more processors/cores/central processing units (CPUs), application-specific integrated circuit (ASIC) chips, field-programmable gate arrays (FPGAs), controllers, memory management units (e.g., IOMMUs, MMUs, etc.), compute units, embedded processors, graphics processors (GPUs)/graphics cores, pipelines, Accelerated Processing Units (APUs), and/or other programmable-logic devices. When such hardware modules are activated, the hardware modules perform some or all of the operations. In some embodiments, the hardware modules include one or more general-purpose circuits that are configured by executing instructions (program code, firmware, etc.) to perform the operations.

In some embodiments, a data structure representative of some or all of the structures and mechanisms described herein (e.g., computing device 100 and/or some portion thereof) is stored on a computer-readable storage medium that includes a database or other data structure which can be read by a computing device and used, directly or indirectly, to fabricate hardware comprising the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates/circuit elements from a synthesis library that represent the functionality of the hardware including the above-described structures and mechanisms. The netlist may then be placed and routed to produce a data set describing geometric shapes to be applied to masks. The masks may then be used in various semiconductor fabrication steps to produce a semiconductor circuit or circuits corresponding to the above-described structures and mechanisms. Alternatively, the database on the computer accessible storage medium may be the netlist (with or without the synthesis library) or the data set, as desired, or Graphic Data System (GDS) II data.

In this description, functional blocks may be referred to in describing some embodiments. Generally, functional blocks include one or more interrelated circuits that perform the described operations. In some embodiments, the circuits in a functional block include circuits that execute program code (e.g., microcode, firmware, applications, etc.) to perform the described operations.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A computing device, comprising:
a first memory;
a second memory, wherein different portions of the first and second memories are logically grouped into two or more migration clusters, so that each migration cluster of the two or more migration clusters includes a corresponding separate portion of the first memory and a corresponding separate portion of the second memory; and
a separate cluster manager associated with each of the two or more migration clusters, each cluster manager configured to:
keep an access record that includes information indicating accesses of pages in the portions of the first and second memories in the corresponding migration cluster; and
based at least in part on the access record, migrate pages only between the portions of the first and second memories in the corresponding migration cluster, so that the cluster manager does not migrate pages between the corresponding migration cluster and migration clusters of other cluster managers.

2. The computing device of claim 1, wherein each cluster manager is further configured to:
keep a remapping record comprising records of portions in the first and second memories in the corresponding migration cluster where migrated pages are located;
receive a memory access request directed to a particular page;
determine, based on the remapping record, a portion of the first and second memories in the corresponding migration cluster where the particular page is located; and
direct the memory access request to the portion of the first and second memories.

3. The computing device of claim 2, wherein each cluster manager is further configured to:
store, in a cache in the cluster manager, one or more subsections of the access record and the remapping record, wherein one or more other subsections of the access record and the remapping record are stored in at least one of the first memory or the second memory.

4. The computing device of claim 3, wherein each cluster manager is further configured to:
receive a plurality of similar memory access requests for which the cluster manager is to use a same particular subsection of the remapping record for determining portions of the first and second memories to which the similar memory access requests are to be directed;
stall the similar memory access requests until a batch of similar memory access requests has been received, the batch comprising a specified number of similar memory access requests; and
when the batch of similar memory access requests has been received, load the particular subsection of the remapping record to the cache in the cluster manager and use the particular subsection of the remapping record to direct the similar memory access requests to corresponding portions of the first and second memories.

5. The computing device of claim 3, further comprising:
a processor-in-memory (PIM) in one or both of the first memory and the second memory, each PIM configured to:
receive a request from a particular cluster manager to update a specified subsection of the remapping record or the access record stored in the corresponding one of the first and second memories; and
update, by the PIM, the specified subsection of the remapping record or the access record in the corresponding one of the first and second memories.

6. The computing device of claim 1, wherein one or more of the cluster managers is configured to perform the migration operation asynchronously with respect to one or more others of the cluster managers.

7. The computing device of claim 1, wherein the computing device is configured to set and dynamically update a migration interval at which one or more of the cluster managers performs the migration operation.

8. The computing device of claim 1, further comprising:
a software entity executed by the computing device, the software entity configured to:
monitor accesses of pages in some or all of the migration clusters; and
based on the accesses of the pages, perform an inter-cluster migration, the inter-cluster migration comprising migrating pages between the portions of the first and second memories in two or more of the migration clusters.

9. The computing device of claim 1, wherein the cluster managers are configured to perform the keeping and migrating operations without receiving corresponding commands from software entities executed by the computing device.

10. The computing device of claim 1, wherein one or more of the cluster managers are configured to receive migration hints from software entities executed by the computing device and perform the migrating operation based at least in part on the migration hints.

11. The computing device of claim 1, wherein, when keeping the access record, the cluster manager is configured to one of:
keep a counter for each of the pages, the counter having a value proportional to the number of accesses for each of the pages; and
keep summary information, the summary information including an indication of a subset of the pages that are being accessed in a specified way.

12. A method for migrating pages in a computing device that includes a first memory and a second memory, wherein different portions of the first and second memories are logically grouped into two or more migration clusters, so that each migration cluster of the two or more migration clusters includes a corresponding separate portion of the first memory and a corresponding separate portion of the second memory, and wherein a separate cluster manager functional block is associated with each of the two or more migration clusters, the method comprising:
by each cluster manager functional block:
keeping an access record that includes information indicating accesses of pages in the portions of the first and second memories in the corresponding migration cluster; and
based at least in part on the access record, migrating pages only between the portions of the first and second memories in the corresponding migration cluster, so that the cluster manager functional block does not migrate pages between the corresponding migration cluster and migration clusters of other cluster manager functional blocks.

13. The method of claim 12, further comprising, by each cluster manager functional block:
keeping a remapping record comprising records of portions in the first and second memories in the corresponding migration cluster where migrated pages are located;
receiving a memory access request directed to a particular page;
determining, based on the remapping record, a portion of the first and second memories in the corresponding migration cluster where the particular page is located; and
directing the memory access request to the portion of the first and second memories.

14. The method of claim 13, further comprising, by each cluster manager functional block:
storing, in a cache in the cluster manager functional block, one or more subsections of the access record and the remapping record, wherein one or more other subsections of the access record and the remapping record are stored in at least one of the first memory or the second memory.

15. The method of claim 14, further comprising, by each cluster manager functional block:
receiving a plurality of similar memory access requests for which the cluster manager functional block is to use a same particular subsection of the remapping record for determining portions of the first and second memories to which the similar memory access requests are to be directed;
stalling the similar memory access requests until a batch of similar memory access requests has been received, the batch comprising a specified number of similar memory access requests; and
when the batch of similar memory access requests has been received, loading the particular subsection of the remapping record to the cache in the cluster manager functional block and using the particular subsection of the remapping record to direct the similar memory access requests to corresponding portions of the first and second memories.

16. The method of claim 14, wherein the computing device further includes a processor-in-memory (PIM) in one or both of the first memory and the second memory, and wherein the method further comprises, by each PIM:
receiving a request from a particular cluster manager functional block to update a specified subsection of the remapping record or the access record stored in the corresponding one of the first and second memories; and
updating, by the PIM, the specified subsection of the remapping record or the access record in the corresponding one of the first and second memories.

17. The method of claim 12, further comprising performing, by the cluster manager functional block, the migration operation asynchronously with respect to one or more others of the cluster manager functional blocks.

18. The method of claim 12, further comprising setting and dynamically updating, by the cluster manager functional block, a migration interval at which one or more of the cluster manager functional blocks performs the migration operation.

19. The method of claim 12, further comprising, by a software entity in the computing device:
monitoring accesses of pages in some or all of the migration clusters; and
based on the accesses of the pages, performing an inter-cluster migration, the inter-cluster migration comprising migrating pages between the portions of the first and second memories in two or more of the migration clusters.

20. The method of claim 12, wherein the cluster manager functional block performs the keeping and migrating operations without receiving corresponding commands from software entities executed by the computing device.

* * * * *